United States Patent
Yoon et al.

(10) Patent No.: US 11,146,321 B2
(45) Date of Patent: Oct. 12, 2021

(54) METHOD AND APPARATUS FOR TRANSMITTING AND RECEIVING SIGNALS IN WIRELESS COMMUNICATION SYSTEM

(71) Applicant: LG ELECTRONICS INC., Seoul (KR)

(72) Inventors: Sukhyon Yoon, Seoul (KR); Hyunsoo Ko, Seoul (KR); Kijun Kim, Seoul (KR); Byounghoon Kim, Seoul (KR); Eunsun Kim, Seoul (KR)

(73) Assignee: LG ELECTRONICS INC.

( * ) Notice: Subject to any disclaimer, the term of this patent is extended or adjusted under 35 U.S.C. 154(b) by 32 days.

(21) Appl. No.: 16/652,022

(22) PCT Filed: Oct. 1, 2018

(86) PCT No.: PCT/KR2018/011651
§ 371 (c)(1),
(2) Date: Mar. 27, 2020

(87) PCT Pub. No.: WO2019/066624
PCT Pub. Date: Apr. 4, 2019

(65) Prior Publication Data
US 2020/0266870 A1    Aug. 20, 2020

Related U.S. Application Data

(60) Provisional application No. 62/566,520, filed on Oct. 1, 2017.

(51) Int. Cl.
*H04W 4/00* (2018.01)
*H04B 7/06* (2006.01)
(Continued)

(52) U.S. Cl.
CPC ......... *H04B 7/0632* (2013.01); *H04B 7/0408* (2013.01); *H04B 7/0617* (2013.01); *H04B 17/318* (2015.01)

(58) Field of Classification Search
CPC .. H04B 17/318; H04B 7/0408; H04B 7/0617; H04B 7/0632; H04B 7/0695; H04B 7/088
See application file for complete search history.

(56) References Cited

U.S. PATENT DOCUMENTS

2017/0346539 A1* 11/2017 Islam ............... H04B 7/0417

OTHER PUBLICATIONS

PCT International Application No. PCT/KR2018/011651, Written Opinion of the International Searching Authority dated Jan. 14, 2019, 17 pages.

(Continued)

*Primary Examiner* — Minh Trang T Nguyen
(74) *Attorney, Agent, or Firm* — Lee, Hong, Degerman, Kang & Waimey

(57) ABSTRACT

Disclosed are a method and an apparatus for transmitting and receiving signals in a wireless communication system, the method comprising the steps of: measuring signal quality on the basis of a first beam set including a plurality of receiving beams; configuring a second beam set, on the basis of the first beam set, including a smaller number of receiving beams than the first beam set; measuring the signal quality on the basis of the second beam set; determining a reference value for the signal quality on the basis of the quality values measured on the basis of the second beam set; and, when the reference value is equal to or greater than the threshold value, transmitting information on the reference value to a base station, wherein the threshold value is determined on the basis of the maximum value from among the quality values measured on the basis of the first beam set, and a previously configured margin value.

12 Claims, 11 Drawing Sheets

(51) Int. Cl.
H04B 17/318 (2015.01)
H04B 7/0408 (2017.01)

(56) References Cited

OTHER PUBLICATIONS

National Instruments, "Discussion on Nested Usage of RS for Beam Measurement", 3GPP TSG RAN WG1 Meeting #89, R1-1708270, May 2017, 5 pages.
ZTE, "Discussion on beam measurement and reporting", 3GPP TSG RAN WG1 Meeting #90, R1-1712297, Aug. 2017, 12 pages.
Mediatek, "Discussions on SS-block measurement and beam reporting", 3GPP TSG RAN WG1 Meeting #90, R1-1713694, Aug. 2017, 7 pages.
Nokia, et al., "On beam grouping and reporting", 3GPP TSG RAN WG1 Meeting #90, R1-1714249, Aug. 2017, 7 pages.
ZTE, et al., "Discussion on beam management", 3GPP TSG RAN WG1 Meeting NR#3, R1-1715440, Sep. 2017, 11 pages.

* cited by examiner (a)    (b)

METHOD AND APPARATUS FOR TRANSMITTING AND RECEIVING SIGNALS IN WIRELESS COMMUNICATION SYSTEM

CROSS-REFERENCE TO RELATED APPLICATIONS

This application is the National Stage filing under 35 U.S.C. 371 of International Application No. PCT/KR2018/011651, filed on Oct. 1, 2018, which claims the benefit of U.S. Provisional Application No. 62/566,520, filed on Oct. 1, 2017, the contents of which are all hereby incorporated by reference herein in their entirety.

TECHNICAL FIELD

The present invention relates to a wireless communication system and, more particularly, to a method and apparatus for transmitting and receiving a radio signal.

BACKGROUND ART

As many more communication devices have required higher communication capacity, the necessity of the enhanced mobile broadband (eMBB) communication much improved than the legacy radio access technology (RAT) has increased. In addition, massive machine type communication (mMTC) capable of providing various services at anytime and anywhere by connecting a number of devices or objects to each other has been considered in the next generation communication system.

Moreover, a communication system design capable of supporting services/UEs sensitive to reliability and latency has been discussed. The introduction of the next generation RAT considering the eMBB communication, mMTC, Ultra-reliable and low latency communication (URLLC), and the like has been discussed.

DISCLOSURE

Technical Problem

A method for efficiently measuring signal quality by a user equipment (UE) supporting beamforming a wireless communication system is required.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a method for transmitting and receiving signals by a user equipment (UE) in a wireless communication system may include measuring a signal quality based on a first beam set including a plurality of reception beams, configuring a second beam set including a smaller number of reception beams than the first beam set based on the first beam set, measuring the signal quality based on the second beam set, determining a reference value for the signal quality based on values of the quality measured based on the second beam set, and based on the reference value being greater than or equal to a threshold value, transmitting information about the reference value to a base station, wherein the threshold value may be determined based on a maximum value among values of the quality measured based on the first beam set and a preset margin value.

The method may further include based on the reference value being less than the threshold value, updating the second beam set, measuring the signal quality based on the updated second beam set, and updating the threshold value based on the values of the quality measured based on the updated second beam set.

The updating of the second beam set may include expanding the second beam set to a beam set including a larger number of reception beams than the second beam set.

The beam set including the larger number of reception beams than the second beam set may include the first beam set.

The second beam set may include beams having odd indexes or beams having even indexes among the plurality of reception beams included in the first beam set.

The second beam set may include beams having a different beam width from the plurality of reception beams included in the first beam set.

The reference value may be determined as a maximum value among values of the quality measured based on the second beam set.

The measuring of the signal quality based on the first beam set may include measuring a received signal received power (RSRP) based on the first beam set, and the measuring of the signal quality based on the second beam set may include measuring an RSRP based on the second beam set.

The measuring of the signal quality based on the second beam set may include measuring the signal quality based on the second beam set at a first time. The method may further include measuring the signal quality based on a third beam set at a second time, and based on the first time and the second time having elapsed, updating the threshold value based on values of the quality measured based on the second beam set and the third beam set, wherein the second beam set may include beams having odd indexes among the plurality of reception beams included in the first beam set, and the third beam set may include beams having even indexes among the plurality of reception beams included in the first beam set.

The determining of the reference value may include based on regions of beams included in the second beam set overlapping each other, selecting quality values greater than the threshold value from among values of the quality measured based on the second beam set, and determining the reference value based on the selected quality values.

In another aspect of the present disclosure, a user equipment (UE) for transmitting and receiving signals in a wireless communication system may include a transceiver and a processor, wherein the processor may be configured to measure a signal quality based on a first beam set including a plurality of reception beams, configure a second beam set including a smaller number of reception beams than the first beam set based on the first beam set, measure the signal quality based on the second beam set, determine a reference value for the signal quality based on values of the quality measured based on the second beam set, and control the transceiver to transmit, based on the reference value being greater than or equal to a threshold value, information about the reference value to a base station, wherein the threshold value may be determined based on a maximum value among values of the quality measured based on the first beam set and a preset margin value.

Advantageous Effects

According to the present disclosure, signal quality may be more efficiently measured in a wireless communication system.

In addition, according to the present disclosure, signal quality may be more efficiently measured by a UE that supports beamforming.

In addition, according to the present disclosure, the overhead according to measurement of signal quality may be reduced.

It will be appreciated by persons skilled in the art that that the effects that can be achieved through the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
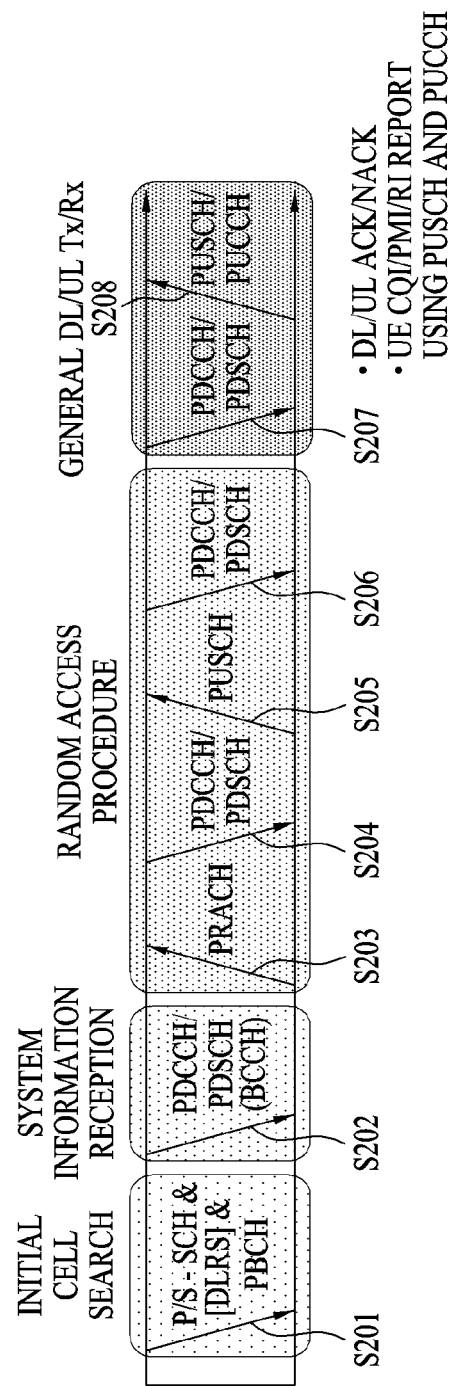
FIG. 1 is a view illustrating physical channels and a general signal transmission method using the physical channels in a 3GPP system.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The detailed description, which will be given below with reference to the accompanying drawings, is intended to explain exemplary embodiments of the present disclosure, rather than to show the only embodiments that can be implemented according to the disclosure.

Although the terms used in the present disclosure are selected from generally known and used terms while considering functions of the present disclosure, they may vary according to intention or customs of those skilled in the art or emergence of new technology. Some of the terms mentioned in the description of the present disclosure may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The embodiments of the present disclosure described hereinbelow are combinations of elements and features of the present disclosure. The elements or features may be considered selective unless mentioned otherwise. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present disclosure (more particularly, in the context of the following claims) unless indicated otherwise in the specification or unless context clearly indicates otherwise.

Terms to be used in this application are defined as follows.

In the following description, a user equipment (UE) may be a fixed or mobile user equipment (UE), and may be any one of various devices that transmit and receive user data and/or various kinds of control information by communicating with a base station (BS). The UE may be referred to as a Terminal Equipment, Mobile Station (MS), Mobile Terminal (MT), User Terminal (UT), Subscriber Station (SS), wireless device, Personal Digital Assistant (PDA), wireless modem, or handheld device.

In the following description, a Base Station (BS) is a fixed station that generally communicates with a UE or another BS. The BS communicates with a UE or another BS to exchange various kinds of data and control information with a UE or another BS. The BS may be referred to as an Advanced Base Station (ABS), Node-B (NB), evolved-NodeB (eNB), Base Transceiver System (BTS), Access Point (AP), or Processing Server (PS). Specifically, a base station (BS) of UTRAN will hereinafter be referred to as Node-B, a base station (BS) of E-UTRAN will hereinafter be referred to as eNB, and a base station (BS) of a new radio access technology network will hereinafter be referred to as gNB.

Techniques, devices, and systems described herein can be used in various wireless multiple access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), Multi-Carrier Frequency Division Multiple Access (MC-FDMA), etc.

CDMA may be implemented as a radio technology such as Universal Terrestrial Radio Access (UTRA) or CDMA2000. TDMA may be implemented as a radio technology such as Global System for Mobile communication (GSM), General Packet Radio Service (GPRS), and Enhanced Data Rates for GSM Evolution (EDGE). OFDMA may be implemented as a radio technology such as Institute of Electrical and Electronics Engineers (IEEE) 802.11 (Wi-Fi), IEEE 802.16 (WiMAX), IEEE 802.20, Evolved-UTRA (E-UTRA), etc.

UTRA is a part of Universal Mobile Telecommunication System (UMTS) and $3^{rd}$ Generation Partnership Project (3GPP) Long Term Evolution (LTE) is a part of Evolved UMTS (E-UMTS) using E-UTRA. 3GPP LTE employs OFDMA for downlink and SC-FDMA for uplink. LTE-A is an evolution of 3GPP LTE. For the sake of clarity, it is assumed that the present disclosure is applied to 3GPP communication systems, for example, LTE/LTE-A systems, NR (New Radio Access Technology) system, etc. However, the technical features of the present disclosure are not limited thereto. For example, while the following detailed description is given under the assumption that a 3GPP communication system is being used as a mobile communication system, the description is applicable to any other mobile communication system except for specific features inherent to the 3GPP LTE/LTE-A/NR systems.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals.

An RS is a signal with a predefined special waveform known to both a gNode B (gNB) and a UE, and may also be referred to as a pilot. For example, cell specific RS, UE-specific RS (UE-RS), positioning RS (PRS), and channel state information RS (CSI-RS) are defined as DL RSs.

The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal.

In the present disclosure, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

For the terms and techniques which are used herein but not specifically described, 3GPP LTE/LTE-A standard documents, for example, 3GPP TS 36.211, 3GPP TS 36.212, 3GPP TS 36.213, 3GPP TS 36.321 and 3GPP TS 36.331 may be referenced, and 3GPP NR standard documents, for example, 3GPP TS 38.211, 3GPP TS 38.212, 3GPP 38.213, 3GPP 38.214, 3GPP 38.215, 3GPP TS 38.321 and 3GPP TS 38.331 may also be referenced.

FIG. 1 illustrates physical channels and a general method for transmitting signals on the physical channels in the 3GPP system.

When a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed. As described above, the introduction of the next generation RAT considering the enhanced mobile broadband communication, massive MTC, Ultra-reliable and low latency communication (URLLC), and the like has been discussed. In the current 3GPP, many developers and companies are conducting intensive research into the next generation mobile communication system after EPC. The next generation mobile communication system after EPC may be referred to as a new RAT (NR) system, a 5G RAT system, or a 5G system. For convenience of description, the next generation mobile communication system after EPC will hereinafter be referred to as an NR system.

Higher and superior performances better than those of the legacy 4G system in terms of a data rate, capacity, latency, energy consumption, and energy costs should be supplied to the NR system. Therefore, it is necessary for the NR system to be significantly evolved in various fields, i.e., a bandwidth, spectral, energy, signaling efficiency, and cost-per-bit reduction.

The NR system may use the OFDM transmission scheme or other similar transmission methods. For example, the NR system may use numerologies shown in the following Table 1.

TABLE 1

| Parameter | Value |
| --- | --- |
| Subcarrier-spacing (Δf) | 60 kHz |
| OFDM symbol length | 16.33 us |
| Cyclic Prefix(CP) length | 1.30 us/ 1.17 us |
| System BW | 80 MHz |
| No. of available subcarriers | 1200 |
| Subframe length | 0.25 ms |
| Number of OFDM symbol per Subframe | 14 symbols |

As another example, the NR system may selectively use one among a plurality of OFDM numerologies shown below in Table 2.

TABLE 2

| Parameter | Value | Value | Value | Value |
| --- | --- | --- | --- | --- |
| Subcarrier-spacing Δf) | 15 kHz | 30 kHz | 60 kHz | 120 kHz |
| OFDM symbol length | 66.66 | 33.33 | 16.66 | 8.33 |
| Cyclic Prefix(CP) length | 5.20 us/ 4.69 us | 2.60 us/ 2.34 us | 1.30 us/ 1.17 us | 6.51 us/ 5.86 us |
| System BW | 20 MHz | 40 MHz | 80 MHz | 160 MHz |
| No. of available sub carriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

Referring to Table 2, OFDM numerologies having subcarrier spacings of 30, 60, and 120 kHz, which are multiples of 15 kHz, may be used based on a subcarrier spacing of 15 kHz used in the LTE system. The cyclic prefix (CP) length, system bandwidth (BW), number of available subcarriers, subframe length, and number of OFDM symbols per subframe, shown in Table 2, are merely examples and the present disclosure is not limited to the examples represented in Table 2. For example, for the 60 kHz subcarrier spacing, the system BW may be set to 100 MHz and the number of available subcarriers may have a value greater than 1500 and less than 1666.

The NR system may be based on OFDM parameters of the LTE system and other parameters. Alternatively, the NR system may be based on numerologies of the legacy LTE/LTE-A without change, and may have a larger system bandwidth (e.g., 100 MHz) as compared to the legacy LTE/LTE-A. In addition, the NR system may allow one cell to support a plurality of numerologies. That is, in the NR system, UEs operating in different numerologies may coexist in one cell.

In the 3GPP LTE/LTE-A system, a radio frame is 10 ms (307200 Ts) long, including 10 equal-size subframes (SFs). The 10 SFs of one radio frame may be assigned numbers. Ts represents a sampling time and is expressed as Ts=1/(2048*15 kHz). Each SF is 1 ms, including two slots. The 20 slots of one radio frame may be sequentially numbered from 0 to 19. Each slot has a length of 0.5 ms. A time taken to transmit one SF is defined as a transmission time interval (TTI). A time resource may be distinguished by a radio frame number (or radio frame index), an SF number (or SF index), a slot number (or slot index), and so on. A TTI refers to an interval in which data may be scheduled. In the current LTE/LTE-A system, for example, there is a UL grant or DL grant transmission opportunity every 1 ms, without a plurality of UL/DL grant opportunities for a shorter time than 1 ms. Accordingly, a TTI is 1 ms in the legacy LTE/LTE-A system.

Figure 2:
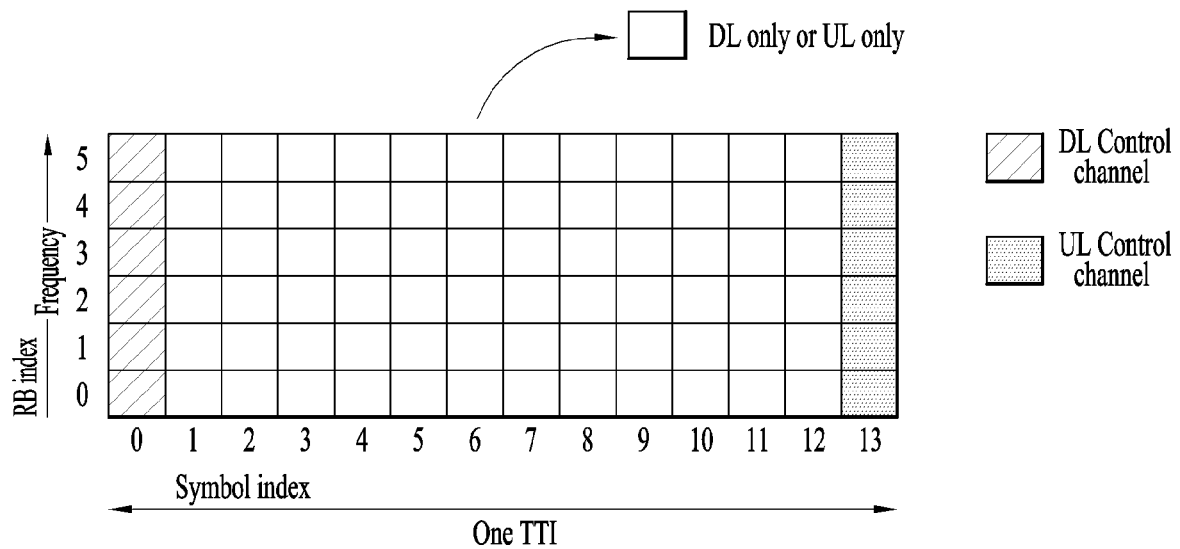
FIG. 2 is a view illustrating an exemplary slot structure available in new radio access technology (NR).

FIG. 2 illustrates an exemplary slot structure available in the new radio access technology (NR).

In the NR system, a slot structure illustrated in FIG. 2 may be used to minimize data transmission latency. The slot structure illustrated in FIG. 2 may also be referred to as a self-contained subframe structure.

Referring to FIG. 2, a hatched area represents a DL control region and a black area represents a UL control region. For example, the hatched area may represent a PDCCH transmission region for carrying DCI. The DCI is control information that a gNB transmits to a UE. The DCI may include, but is not limited to, information about cell configuration that the UE should know, DL specific information such as DL scheduling, and UL specific information such as UL grant. The black area may represent a PUCCH transmission region for carrying UCI. The UCI is control information that the UE transmits to the gNB. The UCI may include, but is not limited to, HARQ ACK/NACK information on DL data, CSI information about a DL channel status, and a scheduling request (SR).

In FIG. 2, an area having no mark (e.g., a symbol region from symbol index 1 to symbol index 12) may be used for transmission of a physical channel (e.g., a PDSCH) carrying DL data or may be used for transmission of a physical channel (e.g., PUSCH) carrying UL data. Referring to FIG. 2, DL transmission and UL transmission take place sequentially in one slot, and transmission/reception of DL data and reception/transmission of a UL ACK/NACK for the DL data may be performed in the one slot. Therefore, when an error is generated during data transmission, a time taken for a data retransmission may be reduced, thereby minimizing the delay of a final data transmission.

In slot structure illustrated in FIG. 2, a time gap is required to allow a gNB and a UE to switch from a transmission mode to a reception mode or from the reception mode to the transmission mode. For the switching between the transmission mode and the reception mode, some OFDM symbol corresponding to a DL-to-UL switching time is configured as a guard period (GP) in the slot structure.

In the NR system, a basic transmission unit is a slot. A slot duration includes 14 symbols each having a normal cyclic prefix (CP), or 12 symbols each having an extended CP. In addition, a slot is scaled in time by a function of a used subcarrier spacing.

For an NR system under discussion, a technique of using an ultra-high frequency band (for example, a frequency band at or above 6 GHz) is considered in order to transmit data to a plurality of users at a high transmission rate in a wide frequency band. However, the ultra-high frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lambda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time are limited to or below B although the number of beam directions is different according to connections between B TXRUs and Q antenna elements.

Figure 3:
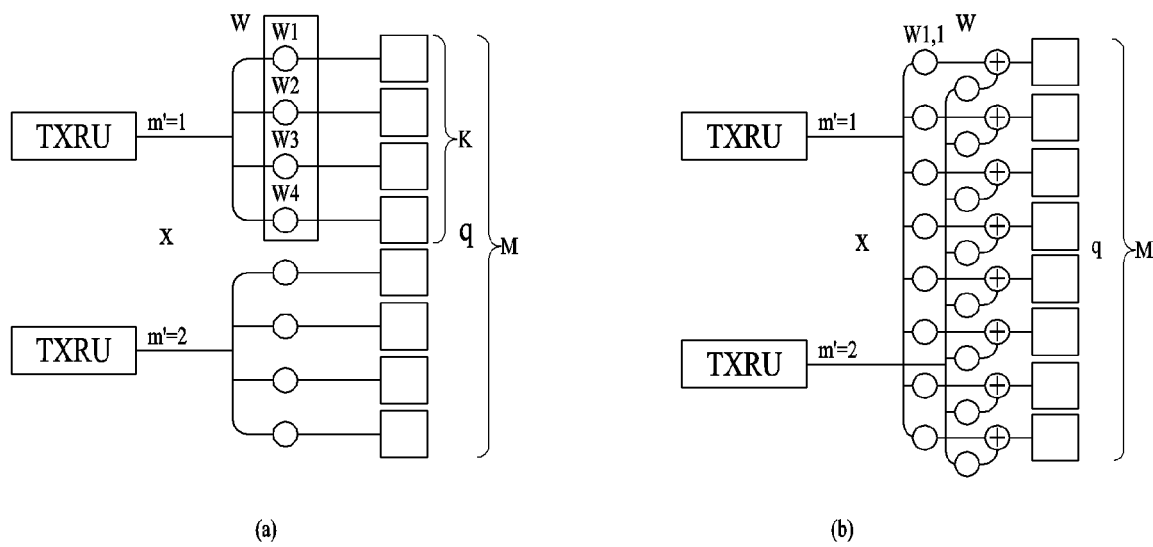
FIG. 3 is a view illustrating exemplary connection schemes between transceiver units (TXRUs) and antenna elements.

FIG. 3 is a view illustrating exemplary connection schemes between TXRUs and antenna elements.

Figure 4:
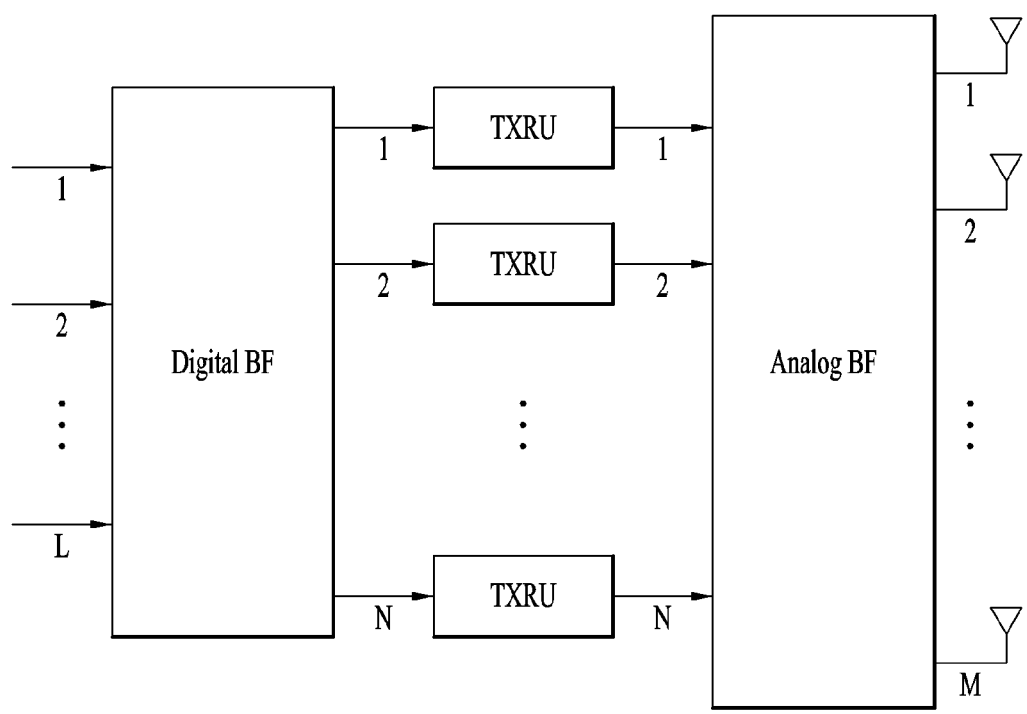
FIG. 4 is a view abstractly illustrating a hybrid beamforming structure in terms of TXRUs and physical antennas.

(a) of FIG. 3 illustrates connection between a TXRU and a sub-array. In this case, an antenna element is connected only to one TXRU. In contrast, (b) of FIG. 4 illustrates connection between a TXRU and all antenna elements. In this case, an antenna element is connected to all TXRUs. In FIG. 3, W represents a phase vector subjected to multiplication in an analog phase shifter. That is, a direction of analog beamforming is determined by W. Herein, CSI-RS antenna ports may be mapped to TXRUs in a one-to-one or one-to-many correspondence.

As mentioned before, since a digital baseband signal to be transmitted or a received digital baseband signal is subjected to a signal process in digital beamforming, a signal may be transmitted or received in or from a plurality of directions on multiple beams. In contrast, in analog beamforming, an analog signal to be transmitted or a received analog signal is subjected to beamforming in a modulated state. Thus, signals cannot be transmitted or received simultaneously in or from a plurality of directions beyond the coverage of one beam. A gNB generally communicates with multiple users at the same time, relying on the wideband transmission or multiple antenna property. If the gNB uses analog BF or hybrid BF and forms an analog beam in one beam direction, the gNB has no way other than to communicate only with users covered in the same analog beam direction in view of the nature of analog BF. A later-described RACH resource allocation and gNB resource utilization scheme according to the present disclosure is proposed by reflecting limitations caused by the nature of analog BF or hybrid BF.

FIG. 4 abstractly illustrates a hybrid beamforming structure in terms of TXRUs and physical antennas.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix.

In FIG. 4, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered.

In the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 5:
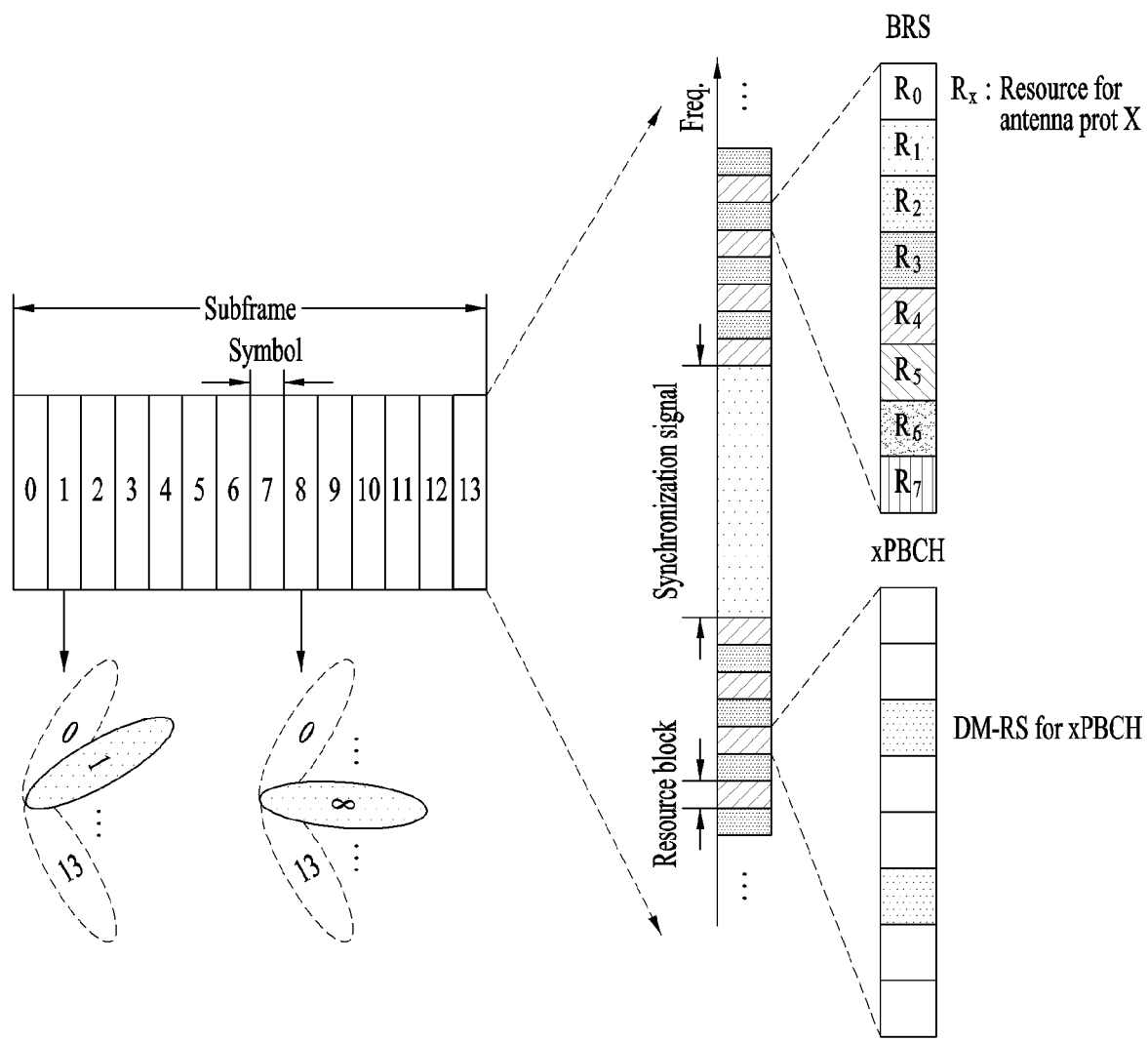
FIG. 5 illustrates a beam sweeping operation performed in a downlink signal transmission process in an NR system.

FIG. 5 illustrates a beam sweeping operation performed in a DL signal transmission process in an NR system.

Referring to FIG. 5, a process of transmitting an SS and system information is illustrated as an example of DL signal transmission. In FIG. 5, an xPBCH may mean a physical resource (or physical channel) over which system information of the NR system is broadcasted.

Analog beams belonging to different antenna panels may be simultaneously transmitted in one symbol. In this case, in order to measure a channel per analog beam, as illustrated in FIG. 5, the introduction of a beam reference signal (BRS), which is a reference signal (RS) to which a single analog beam corresponding to a specific antenna panel is applied, has been discussed. The BRS may be defined for a plurality of antenna ports and each antenna port of the BRS may correspond to a single analog beam. In this case, unlike the BRS, all analog beams in an analog beam group may be applied to the SS or xPBCH to assist a random UE in correctly receiving the SS or xPBCH.

Figure 6:
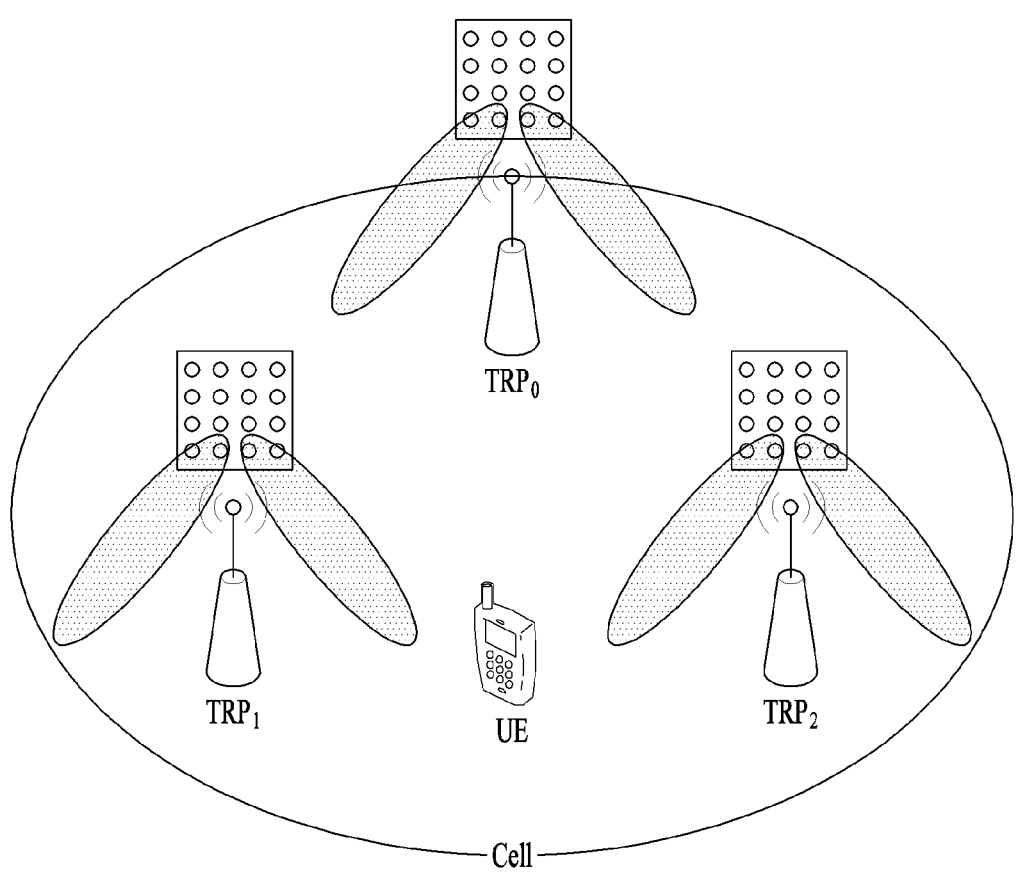
FIG. 6 is a view illustrating an exemplary cell in an NR system.

FIG. 6 is a view illustrating an exemplary cell in the NR system.

Referring to FIG. 6, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system.

Radio Resource Management (RRM) Operation of LTE System

The LTE system supports an RRM operation including power control, scheduling, cell search, cell reselection, handover, radio link or connection monitoring, and connection establishment/re-establishment. In this case, a serving cell may request that the UE send RRM measurement information corresponding to a measurement value for performing the RRM operation. For example, in the LTE system, typically, the UE may measure cell search information, reference signal received power (RSRP), reference signal received quality (RSRQ), etc., for each cell and then report the measured information to the eNB. In the LTE system, the UE receives 'measConfig' as a higher layer signal for RRM measurement from the serving cell and measures RSRP or RSRQ based on the received information of 'measConfig'. In this case, RSRP and RSRQ have been defined in the specification of TS 36.214 of the LTE system.

In the case of intra-frequency measurement, the UE operating in the LTE system may measure RSRP in bandwidth corresponding to one of 6, 15, 25, 50, 75, and 100 RBs transmitted through allowed measurement bandwidth information (e.g., AllowedMeasBandwidth information element (IE)). The allowed measurement bandwidth information may be transmitted in system information block type 3 (SIB3).

In the case of inter-frequency measurement, the UE may measure RSRP in bandwidth corresponding to one of 6, 15, 25, 50, 75, and 100 RBs transmitted through the allowed measurement bandwidth information (e.g., AllowedMeasBandwidth IE). The allowed measurement bandwidth information may be transmitted in system information block type 5 (SIB5). When the allowed measurement bandwidth information is not present, the UE may measure RSRP in the entire DL system frequency band.

Upon receiving the allowed measurement bandwidth information, the UE may regard the value of the allowed measurement bandwidth information as a maximum measurement bandwidth and freely measure RSRP within the maximum measurement bandwidth. However, if the serving cell transmits an IE defined as a wide band RSRQ (WB-RSRQ) and sets the allowed measurement bandwidth to 50 RBs or more, the UE needs to calculate RSRP for the entire allowed measurement bandwidth. Meanwhile, a received signal strength indicator (RSSI) is measured in a frequency bandwidth of a receiver of the UE according to definition of an RSSI bandwidth.

For inter-frequency or inter-RAT measurement, in the LTE system, a measurement gap for performing measurement by the UE may be defined. During the measurement gap, the UE may stop communication with the serving cell and perform inter-frequency or inter-RAT measurement.

Referring to the specification of 36.133, when the UE requires the measurement gap in order to identify and measure inter-frequency and/or inter-RAT cells, E-UTRAN should provide one measurement gap pattern having a predetermined gap duration in order to simultaneously monitor all frequency layers and RATs. Table 3 below shows gap pattern configuration supported by the UE in the LTE system.

TABLE 3

| Gap Pattern Id | MeasurementGap Length (MGL, ms) | Measurement Gap Repetition Period (MGRP, ms) | Minimum available time for inter-frequency and inter-RAT measurements during 480 ms period (Tinter1, ms) | Measurement Purpose |
|---|---|---|---|---|
| 1 | 6 | 40 | 60 | Inter-Frequecy E-UTRAN FDD and TDD, UTRAN FDD, GERAN, LCR TDD, HRPD; CDMA2000 1X |
| 1 | 6 | 80 | 30 | Inter-Freemy E-UTRAN FDD and TDD, UTRAN FDD, GERAN, LCR TDD, HRPD, CDMA2000 1x |

Referring to Table 3, when a gap pattern Id is 0, the UE may monitor frequencies other than frequencies of the serving cell for 6 ms in units of a 40 ms period and, when the gap pattern Id is 1, the UE may monitor frequencies other than frequencies of the serving cell for 6 ms in units of an 80 ms period. For a preset time of 6 ms, the BS may not allocate a resource to the UE or transmit traffic to the UE and the UE may search for an available frequency signal for handover by measuring frequencies other than frequencies of the serving cell. During a measurement gap interval, the UE transmits no data. In addition, during the measurement gap interval, the UE does not tune a receiver of the UE in E-UTRAN subcarriers of a primary cell (PCell) and all secondary cells (SCells) and E-UTRAN subcarriers of the PCell and a primary secondary cell (PSCell). If the measurement gap of 6 ms is ended, the UE monitors the frequencies of the serving cell again.

RSRP Measurement in LTE System Using Multiple Antennas

In the current LTE standard, for a UE receiving a signal through multiple receive antennas, an antenna combining scheme in the operation of measuring, by UEs, RSRP of a neighboring cell through two receive antennas is not limited to a specific method (e.g., maximal ratio combining (MRC) or selection combining (maximum selection)). However, in order to prevent at least measurement in a descending direction among RSRPs measured using two antennas as in the case of a combining/selection scheme such as minimum value selection or two antenna combining, the LTE standard defines a UE operation as indicated by the underline in the following table.

TABLE 4

| Definition | Reference signal received power (RSRP), is defined as the linear average over the power contributions (in [W]) of the resource elements that carry cell-specific reference signals within the considered measurement frequency bandwidth. For RSRP determination the cell-specific reference signals R0 according to TS 36.211 [3] shall be used. If the UE can reliably detect that R1 is available it may use R1 in addition to R0 to determine RSRP. If higher layers indicate measurements based on discovery signals, the UE shall measure RSRP in the subframes in the configured discovery signal occasions. If the UE can reliably detect that cell-specific reference signals are present in other subframes, the UE may use those subframes in addition to determine RSRP. The reference point for the RSRP shall be the antenna connector of the UE. If receiver diversity is in use by the UE, the reported value shall not be lower than the correspondin2 RSRP of any of the individual diversity branches. |
|---|---|
| Applicable for | RRC_IDLE intra-frequency, RRC_IDLE inter-frequency, RRC_CONNECTED intra-frequency, RRC_CONNECTED inter-frequency |

NOTE 1:
The number of resource elements within the considered measurement frequency bandwidth and within the measurement period that are used by the UE to determine RSRP is left up to the UE implementation with the limitation that corresponding measurement accuracy requirements have to be fulfilled.
NOTE 2:
The power per resource element is determined from the energy received during the useful part of the symbol, excluding the CP.

Detection of Neighboring Cell in NR System

An NR system defines communication in a high frequency band such as a millimeter wave (mmWave) band. In a band of tens of GHz, in order to compensate for abrupt attenuation of a transmitted signal, the number of antenna elements of the BS and the UE is increased, and beamforming is performed on signals received through the antenna elements. Beamforming may include, but is not limited to, digital, analog, or hybrid beamforming.

The UE may include an antenna including an antenna element set, a radio frequency integrated chip (RFIC), and a baseband modem. Here, the antenna element set may include multiple antenna elements. In a frequency band such as the mmWave band, beamforming is performed through an antenna for efficient configuration of the UE, and the beamformed signal is transmitted to the RFIC and the baseband modem. In the above-described configuration, the RFIC and the baseband modem, which transform a received signal of the high frequency band into a user signal, directly process the beamformed signal. Accordingly, even in measuring a signal quality, the RFIC and the baseband modem measure the signal quality based on the beamformed signal and report the same to the BS.

The NR system supports a high frequency band such as the mmWave band. In the high frequency band, the BS may transmit a data channel, a control channel, and an SS block using beamforming to secure cell coverage. When the BS transmits a signal using multiple beams, the UE may extend the cell coverage by attempting to receive the data channel, the control channel, and the SS block using multiple beams.

In order to extend the cell coverage, the UE detects a beam having the best signal quality among the multiple beams transmitted from the BS in and after an initial access procedure. Here, the strength of the received power may be used as a quality index in the beam selection and operation procedure. In selecting a beam having the best signal quality, the UE employing multiple beams finds a reception beam having the best signal quality for each transmission beam and forms a pair of each transmission beam and the best reception beam. Then, the formed pair of the transmission beam and the reception beam is used when the UE communicate with the BS.

For the above-mentioned purpose, the BS signals, to the UE on the control channel, a transmission beam through which a data channel used for data transmission is transmitted. Therefore, the UE preferentially configures a reception beam according to the beam through which the control channel is transmitted. Then, upon receiving information on the transmission beam through which the data channel is transmitted on the control channel, the UE forms a reception beam having the best quality for the transmission beam through which the data channel is transmitted, according to the time at which the data channel is received. Then, the UE receives the data channel using the formed reception beam.

In order to secure stable mobility along with communication with a serving cell, the UE measures the signal quality of a neighboring cell, compares the signal quality of the neighboring cell with the signal quality of the serving cell. Then, when a predefined event is satisfied, the UE reports the event to the BS. Here, as the signal quality for mobility, a received signal received power (RSRP) representing the received power may be used. A received signal received quality (RSRQ) may be additionally used as necessary.

In order to compare the signal quality of the serving cell with that of the neighboring cell, the UE measures the signal quality on the assumption that a signal is received through a reception beam having the best quality for each cell, and performs inter-cell handover based on the measured signal quality.

A UE employing multiple beams like an NR system forms a reception beam according to a transmission beam of the serving cell upon receiving a data channel or a control channel from the serving cell. Accordingly, when the UE measures the signal quality of the neighboring cell using the reception beam formed in accordance with the transmission beam of the serving cell, it is difficult to compare the signal quality of the serving cell and the signal quality of the neighboring cell on the equal level. Accordingly, in the NR system, the UE detects a reception beam suitable for each of one or more neighboring cells to measure the signal quality of the neighboring cells. Since the UE is not aware of a beam that matches a neighboring cell, it may perform beam sweeping to detect a reception beam that matches each of the one or more neighboring cells.

Figure 7:
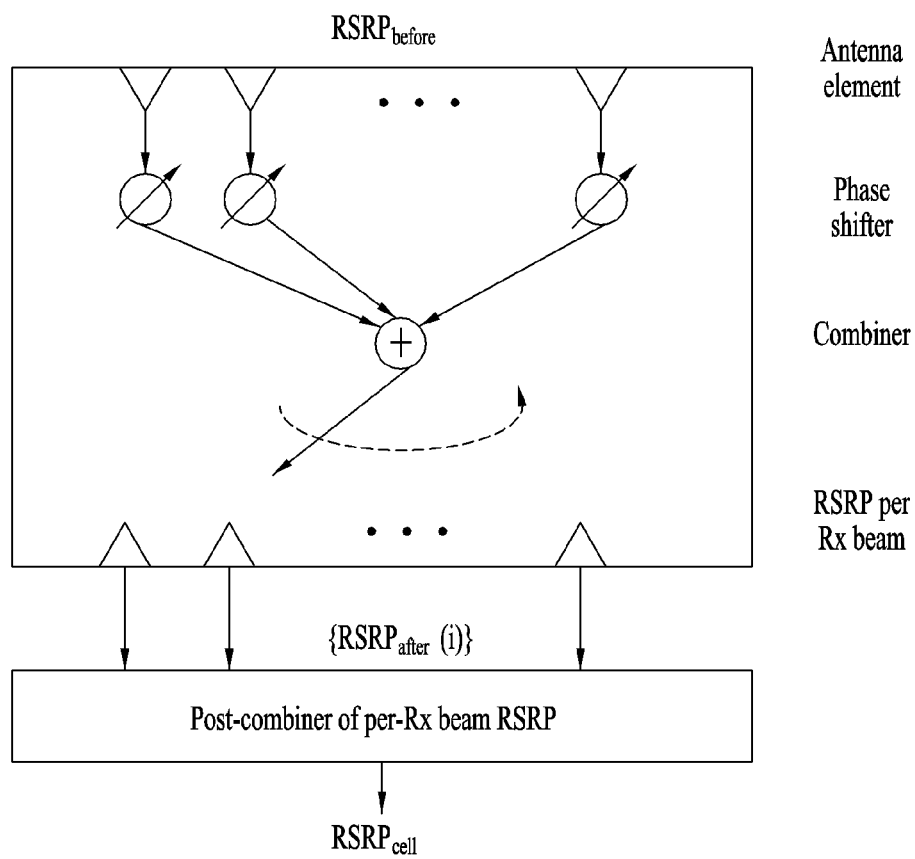
FIG. 7 illustrates an example of beamforming and combining signal quality values measured for respective reception beams.

FIG. 7 illustrates an example of beamforming and combining signal quality values measured for respective reception beams.

Upon measuring the signal quality of a neighboring cell based on the beamformed signal, the UE should finally report the quality of the received signal through an optimal beam. In the operation of measuring the signal quality of the neighboring cell, the UE measures the signal quality of the neighboring cell for each of beams that may be generated. For example, the UE may measure the signal quality of the neighboring cell by measuring the RSRP or RSRQ. However, embodiments are not limited thereto.

Referring to FIG. 7, the UE measures multiple RSRPs (e.g., $RSRP_{after}$) for a neighboring cell using multiple reception beams, and determines an RSRP for the neighboring cell (e.g., $RSRP_{cell}$) based on the multiple measured RSRPs. The multiple values of $RSRP_{after}$ measured using the multiple reception beams may be represented by $RSRP_{after}(i)$ (i=1, . . . , N), as shown in FIG. 7, where N may denote the number of beams. More specifically, referring to FIG. 7, the UE measures the RSRP for a signal beamformed while a signal received through multiple antenna elements passes through a phase shifter and a combiner. The UE does not measure the signal qualities of a neighboring cell simultaneously using multiple beams at the same time, but measures multiple values of $RSRP_{after}$ for one neighboring cell while changing the reception beam direction over time. Accordingly, the UE does not measure the quality of the received signal through a beam having a fixed direction, but measures the quality of the received signal through a beam whose direction is changed. The method of determining $RSRP_{cell}$ based on the multiple values of $RSRP_{after}$ may be changed depending on the UE.

In addition, in the operation of setting the direction of the beam by the UE, the number of beams that may be configured may be limited in consideration of convenience of implementation. In this case, the UE may not form an optimal beam for the received signal, but form a near-optimal beam. The UE may measure the quality of the received signal through multiple near-optimal beams. Multiple signal quality values measured based on the multiple near-optimal beams may be considered as values obtained by applying noise to optimal signal quality values which the UE intends to measure. Therefore, in order to obtain the optimal signal quality values, a method for attenuating and/or compensating for a noise component is needed. For example, to attenuate and/or compensate for the noise component, the average of the measured quality values may be calculated based on all reception beams. However, calculating the average of the quality values measured based on all reception beams may involve a measurement result obtained for a beam in a direction in which a signal is not actually received, thereby yielding a result similar to a result obtained when signal quality is measured using an omni-directional antenna without beamforming. Accordingly, the UE should generate a signal quality value representing a target neighboring cell using some of the multiple measured signal quality values. Here, unlike the case of selection performed using multiple diversity antenna branches, a definition that the selected value should not be less than any other values of the multiple signal quality values (that is, a definition that the maximum value among the multiple measured signal quality values should be reported) is not allowed to be applied.

Accordingly, in the present disclosure, the maximum value among the multiple measured signal quality values may be determined as a primary reference value, and a value obtained by applying a predetermined margin value to the determined primary reference value may be determined as a final reference value. For example, the final reference value may be a value obtained by subtracting the predetermined margin value from the primary reference value, but is not limited thereto. Further, the reference value may be a representative value for the UE to report to the BS among multiple RSRPs measured by the UE. When the UE supports beamforming, the UE may measure RSRPs of a neighboring cell using multiple reception beams, and should determine a representative value to report to the BS among the multiple measured RSRPs. Hereinafter, a method of determining a final reference value reflecting a margin value will be described in detail.

Among multiple signal quality values, the maximum value may be assumed to be a strength value of a signal formed through maximum-ratio-combining (MRC) in the direction of an optimal reception beam. Here, the relationship between a signal strength $RSRP_{before}$ on an antenna element before combining and a signal strength $RSRP_{after}$ at the combiner output after combining will be defined by Equation 1 below.

MRC case: $RSRP_{after}$=N×$RSRP_{before}$ (in linear domain)      [Equation 1]

In addition, as a reference value reflecting the margin value, a value obtained by applying a combination scheme (e.g., equal gain combining (EGC) or selection combining) other than the MRC may be defined. For example, it may be assumed that a signal received through an antenna element is not beamformed based on multiple antenna elements, but the multiple antennas are subjected to an uncorrelated fading channel. In this case, the signal quality value obtained by applying the aforementioned combining scheme (e.g., EGC or selection combining) may be determined as a reference value reflecting the margin value.

When the EGC or selection combining is applied, the relationship between the signal strength $RSRP_{before}$ on an antenna element before combining and the signal strength $RSRP_{after}$ at the combiner output after combining may be defined by Equation 2 below.

EGC case: $RSRP_{after}$=[1+(N−1)×π/4]×$RSRP_{before}$ (in linear domain);

Selection combining case: RSRPafter=[C+ln(N)+1/(2N)]×RSRPbefore (in linear domain),     [Equation 2]

where C (Euler-Mascheroni constant)=0.5772 . . . , ln( ): natural log

The reference value $RSRP_{ref}$ may be defined by reflecting all the aforementioned values. For example, when all values approximated for EGC and selection combining are listed, reference values as in Equation 3 below may be defined.

$RSRP_{cell} = \max\{RSRP_{after}(i)\}$, where $i = 1$,     [Equation 3]

. . . , $N$ ($N$: the number of receiving beam)

EGC 1: $RSRP_{ref}[dB] = RSRP_{cell}[dB]$ −

[10xlog10(N) − 10xlog10(1 + (N − 1)xπ/4)]

EGC 2: $RSRP_{ref}[dB] = RSRP_{cell}[dB]$ −

[10xlog10(N) − 10xlog10((N − 1)xπ/4)]

EGC 2: $RSRP_{ref}[dB] = RSRP_{cell}[dB] − [10x\log10(4/\pi)]$

SC 1: $RSRP_{ref}[dB] = RSRP_{cell}[dB]$ −

$$\left[10x\log10(N) - 10x\log10\left(\sum_{n=1}^{N} \frac{1}{n}\right)\right]$$

SC 1: $RSRP_{ref}[dB] = RSRP_{cell}[dB] − [10x\log10(N)$ −

$10x\log10(C + \ln(N) + 1/(2N))]$

SC 2: $RSRP_{ref}[dB] = RSRP_{cell}[dB] − [10x\log10(N/\ln(N))]$

Referring to Equation 3, $RSRP_{cell}$ may be determined as a maximum value among the multiple values of $RSRP_{after}$. In addition, the reference value $RSRP_{ref}$ in the case where each combining scheme is applied may be determined as a value obtained by applying a margin value to $RSRP_{cell}$. Here, the margin value may be determined based on the number N of antenna elements used for beamforming. The margin value may be determined differently according to a combining scheme applied. In addition to the above-mentioned reference values, a value of $RSRP_{ref}$ may be calculated by reflecting, in in Equation 3, the number of antenna elements used for beamforming, and then an approximated value of the calculated value may be used as a reference value.

In addition, the reference value obtained by applying the margin value may be defined as shown in Table 5 below. Here, the margin value may be represented by another equation for approximation in addition to the equations shown in Table 5, or may be represented by a quantized value when the number of antenna elements, N, used for beamforming is given. Alternatively, for easy implementation, an arbitrary value reflecting the antenna of the UE receiver and combining characteristics may be selected.

TABLE 5

If receive beamforming is in use by the UE, the reported value shall not be lower than the corresponding RSRP of any of the N individual receive beamformers less a margin, where the margin is given by $$10\log 10 \left[N \bigg/ \sum_{n=1}^{N} \frac{1}{n}\right] \text{ [dB] when } UE \text{ utilizes } N \text{ receive beamformers.}$$

Alternatively, the margin may be expressed by
○ 10log10 [N/C + ln(N) + 1/2N)] [dB] or approximately 10log10 [N/ln (N)]
[dB]: selection diversity with independent fading assumption, where C (Euler–Mascheroni constant) = 0.5772...
○ 10log10 [N/(1 + (N − 1) × π/4)] [dB] or approximately 10log10[4/π] [dB]: equal gain combining After measuring the quality of the received signal through beam sweeping, the UE may measure RSRP (or RSRQ) for each beam, and use the margin value defined above in deriving one RSRP value among the multiple measured RSRP values.

Deriving a Beam Sub-Set for Reduction of Complexity From a Beam Set for Measuring RSRP In general, the receiver of a UE supporting a mmWave frequency band includes multiple antenna elements for beamforming. The UE may form reception beams in multiple directions using multiple antenna elements. The UE is capable of infinitely forming beams according to a method of configuring weights using oversampling for beamforming, but avoid configuring beams infinitely for ease of implementation. However, for data reception, the UE may attempt to find an optimal beam using as many beams as possible (Rx beam tracking). However, in the signal quality measurement operation (e.g., the RSRP measurement) for supporting mobility, in order to detect a neighboring cell reaching in any directions and measure the strength of a received signal, the UE may configure a beam set for signal quality measurement by quantizing only a specific set of some beams among the many reception beams. Then, the UE measures the signal quality of the neighboring cell using the configured beam set. For example, the UE may measure RSRP or RSRQ for the neighboring cell to measure the signal quality for the neighboring cell. However, embodiments are not limited thereto. According to an embodiment, the beam set for signal quality measurement may be referred to as an RSRP measurement beam set or an RSRQ measurement beam set, and is not limited to the above-described example. Hereinafter, for simplicity, a case where the UE measures RSRP to measure the signal quality of a neighboring cell will be described as an example.

For example, in order to receive data, a UE including 16 antenna elements may configure 64 reception beams and perform communication with a serving cell using an optimal beam among the 64 configured reception beams. However, the UE may configure a beam set for RSRP measurement by extracting 16 reception beams from the 64 reception beams, and measure the RSRP using the configured beam set.

When the UE always measures RSRP using all the 16 reception beams, the actual RSRP may be more accurately reflected. However, in the case where the UE does not move at a relatively high speed, or there are many relatively spatially overlapped regions between the 16 beams without the characteristics of the reception beam significantly changing, the UE may measure the RSRP using a smaller number of reception beams. Accordingly, the UE may reduce power consumption required for RSRP measurement, or increase a periodicity of measurement report. However, even in the above-described case, the UE should ensure accuracy above a certain level for the measured RSRP. Hereinafter, an operation of the UE for addressing the above-mentioned issue will be discussed.

a) Configuring Fixed Rx Beam Sub-Set

According to an embodiment, the UE may configure 16 reception beams as a beam set for RSRP measurement, and measure RSRP using the 16 reception beams. Then, the UE may configure a beam sub-set based on the configured beam set in the calibration operation. The beam sub-set refers to a set including a smaller number of beams than the configured beam set for RSRP measurement. For example, the beam sub-set may be composed of some beams selected from among the multiple beams included in the beam set. According to an embodiment, the beam sub-set may include multiple beams having a beam width different from those of the beam set. For example, the beams included in the beam sub-set may represent beams formed to cover two beam widths among the multiple beams included in the beam set, but is not limited thereto. According to an embodiment, the beam sub-set may be called by another term. For example, the beam set for RSRP measurement may be referred to as a first beam set, and the beam sub-set may be referred to as a second beam set. However, embodiments are not limited thereto. In addition, the calibration operation may be included in a performance requirement test or factory manufacturing step, but is not limited thereto.

When the configured beam sub-set satisfies a threshold value reflecting a preset margin value, the UE may measure RSRP based on the configured beam sub-set. However, according to an embodiment, the UE may use the beam set in place of the beam sub-set during the operation depending on a service type or an environment measurement result that is actually operated.

b) Configuring Dynamic Rx Beam Sub-Set

According to method a) of configuring a fixed beam sub-set, it may be difficult to update the beam sub-set when the RSRP accuracy is lowered during the operation. Accordingly, a method to update the beam sub-set when the accuracy of the measured RSRP is lowered during the operation may be needed. Hereinafter, a method of updating a beam sub-set based on a beam set will be described on the assumption that the UE has preconfigured the beam set for RSRP measurement.

According to an embodiment, the UE may obtain a reference value $RSRP_{ref}$ representing multiple measured RSRP values based on the beam set for RSRP measurement, and report the value of $RSRP_{ref}$. For example, $RSRP_{ref}$ may refer to a maximum value among the multiple measured RSRP values. In addition, the UE may set a maximum value among the RSRP values measured for each beam to $RSRP_{max}$.

In addition, the UE may obtain $RSRP_{ref}$ using a beam sub-set configured based on the beam set. Here, $RSRP_{ref}$ may be a maximum value among the RSRP values measured based on the beam sub-set. The beam sub-set may be configured in multiple levels. For example, when the beam set includes 16 reception beams {Rx #1, Rx #2, ..., Rx15, Rx16}, a beam sub-set configured in the first level may include 8 reception beams {Rx #1, Rx #3, ..., Rx #15}, and a beam sub-set configured in the second level may include four reception beams {Rx #1, Rx #5, Rx #9, Rx13}. However, embodiments are not limited thereto.

When $RSRP_{ref}$ is greater than a threshold value, the UE measures RSRP based on the configured beam sub-set. In this case, the threshold value may be a value obtained by reflecting a preset margin value in $RSRP_{max}$. For example, the threshold value may refer to a value obtained by subtracting the preset margin value from $RSRP_{max}$ ($RSRP_{max}$-margin value). According to an embodiment, when the beam sub-set is configured in multiple levels and $RSRP_{ref}$ is greater than the threshold value, the UE may configure a new beam sub-set including a smaller number of beams than the beam sub-set, and RSRP may be measured based on the new beam sub-set. Accordingly, the UE may reduce power consumption required for RSRP measurement, and measure RSRP more efficiently using a smaller number of beams.

However, when $RSRP_{ref}$ is less than the threshold value, the UE may expand the configured beam sub-set and measure RSRP using the expanded beam sub-set. Here, expanding the beam sub-set may mean updating the beam sub-set to include more beams than the beam sub-set. For example, when the beam set and the beam sub-set for RSRP measurement are configured in two levels, the beam sub-set may be expanded to the beam set.

Figure 8:
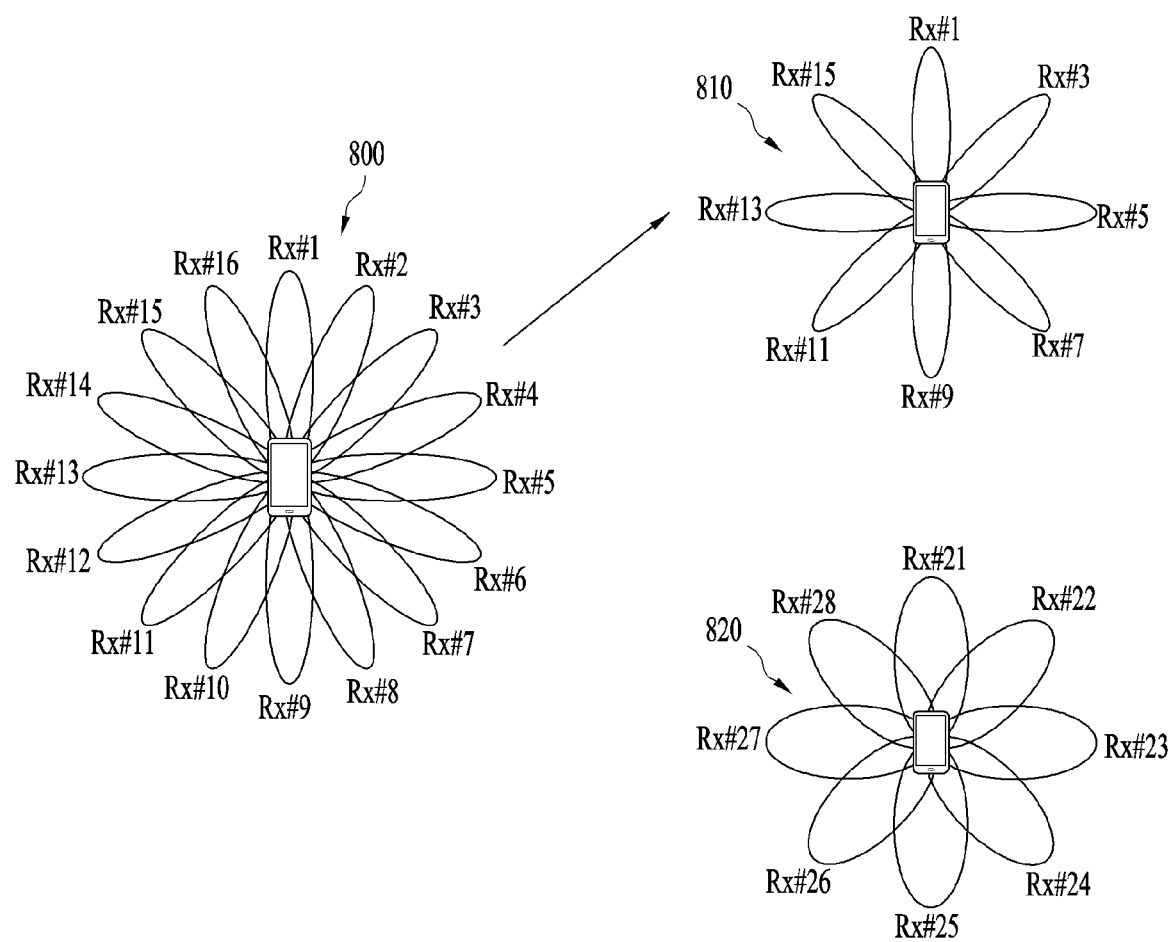
FIG. 8 shows an example of configuring a beam sub-set based on a beam set for measuring 16 RSRPs.

FIG. 8 shows an example of configuring a beam sub-set based on a beam set for measuring 16 RSRPs.

Referring to FIG. 8, a beam set 800 for measuring $RSRP_{ref}$ may include 16 reception beams {Rx #1, Rx #2, ..., Rx #15, Rx #16}. When $RSR_{ref}$ measured based on the beam set 800 is greater than a preset threshold value, the UE may configure a beam sub-set based on the beam set 800. As described above, the beam sub-set may include a smaller number of beams than the beam set 800. For example, the beam sub-set may be configured to include some beams selected from among the multiple beams constituting the beam set 800. For example, as illustrated in FIG. 8, the beam sub-set 810 may include 8 beams having odd indexes {Rx #1, Rx #3, ..., Rx #13, Rx #15} among the 16 beams constituting the beam set 800. According to an embodiment, the beam sub-set may include 8 beams having even indexes {Rx #2, Rx #4, ..., Rx #14, Rx #16} among the 16 beams constituting the beam set 800, but is not limited thereto.

In addition, the beam sub-set may be composed of beams having a different beam width from the beams constituting the beam set 800. For example, a beam sub-set 820 may include 8 beams newly formed based on the 16 beams constituting the beam set 800. As shown in FIG. 8, the beam sub-set 820 may be composed of beams configured to cover two beams constituting the beam set 800. For example, beam Rx #21 constituting the beam sub-set 820 may be a beam formed to cover two beams Rx #1 and Rx #2 included in the beam set 800, and beam Rx #22 may be a beam formed to cover Rx #3 and Rx #4 included in the beam set 800.

b-1. Scheme #1

According to an embodiment, the UE may configure a beam sub-set based on a beam set including 16 reception beams.

TABLE 6

$D_1$: {RX#1, Rx#2, ... , Rx#15, Rx#16}: Update $RSRP_{max=}$ = max{$RSRP(i), i = 1, 2, 3, ... , 16$}

$D_2$: {RX#1, Rx#3, ... , Rx#13, Rx#15}: $RXRP_{ref}$ = max{$RSRP(i), i = 1, 3, ... 15$} > $RSRP_{max}$ − margin $D_3$: {RX#1, Rx#3, ... , Rx#13, Rx#15}: $RXRP_{ref}$ = max{$RSRP(i), i = 1, 3, ... 15$} > $RSRP_{max}$ − margin $D_4$: {RX#1, Rx#3, ... , Rx#13, Rx#15}: $RXRP_{ref}$ = max{$RSRP(i), i = 1, 3, ... 15$} > $RSRP_{max}$ − margin

...

$D_X$: {RX#1, Rx#3, ... , Rx#13, Rx#15}: $RXRP_{ref}$ = max{$RSRP(i), i = 1, 3, ... 15$} < $RSRP_{max}$ − $margin_{+'}$ $D_{X+1}$: {RX#1, Rx#2, ... , Rx#15, Rx#16}: Update $RSRP_{max=}$ = max{$RSRP(i), i = 1, 2, 3, ... , 16$}$_{+'}$ $D_{X+2}$: {RX#1, Rx#3, ... , Rx#13, Rx#15}: $RXRP_{ref}$ = max{$RSRP(i), i = 1, 3, ... 15$} < $RSRP_{max}$ − $margin_{+'}$.

For example, referring to Table 6, the UE may configure a beam set including 16 beams {Rx #1, Rx #2, ..., Rx #16} in duration D1, and measure multiple RSPRs (e.g., RSRP(i)) using the configured beam set. The UE may determine $RSRP_{ref}$ to report as a signal quality value based on the multiple measured RSRPs, and report the determined value of $RSRP_{ref}$. Here, $RSRP_{ref}$ may be determined as the maximum value among the multiple measured RSRPs. The UE may set the maximum value among the multiple measured RSRPs to $RSRP_{ref}$.

In duration D2, the UE may configure a beam sub-set including beams having odd indexes {Rx #1, Rx #3, ..., Rx #15}, measure multiple RSRPs based on the configured beam sub-set, determine $RSRP_{ref}$ based on the multiple measured RSRPs, and report determined $RSRP_{ref}$. For example, $RSRP_{ref}$ may be determined as the maximum value among the multiple RSRP values measured based on the beam sub-set.

The UE checks whether $RSRP_{ref}$ satisfies a preset threshold value (e.g., whether $RSRP_{ref}$ is greater than the preset threshold value). When $RSRP_{ref}$ satisfies the preset threshold value, the UE continues to measure RSRP using the configured beam sub-set.

When the RSRP measurement result in duration Dx does not satisfy the preset threshold value (e.g., the RSRP measurement result is less than or equal to the preset threshold value) after the UE continues to measure RSRP using the beam sub-set, the UE may measure RSRP in duration Dx+1, using the beam set.

In addition, as described above, the beams constituting the beam sub-set may have a different beam width from the beams constituting the beam set. For example, the beam set may include 16 beams {Rx #1, Rx #2, ..., Rx #16} having a beam width of 30 degrees, and the beam sub-set configured based on the beam set may include 8 beams having a beam width of 60 degrees. Accordingly, the UE may configure a beam sub-set by selecting some beams from among the beams constituting the beam set, or may configure a beam sub-set by forming new beams based on the beams constituting the beam set.

When $RSRP_{ref}$ measured based on the beam sub-set fails to satisfy the threshold value (for example, $RSRP_{ref}$ is less than the threshold value), $RSRP_{ref}$ may hardly be considered to accurately reflect the actual RSRP. Accordingly, when $RSRP_{ref}$ fails to satisfy the threshold as a result of checking whether $RSRP_{ref}$ satisfies the threshold value, the UE may update the beam sub-set, and measure RSRP using the updated beam sub-set. Accordingly, the UE may keep the accuracy for the measured RSRP above a certain level by dynamically configuring a beam sub-set.

Figure 9:
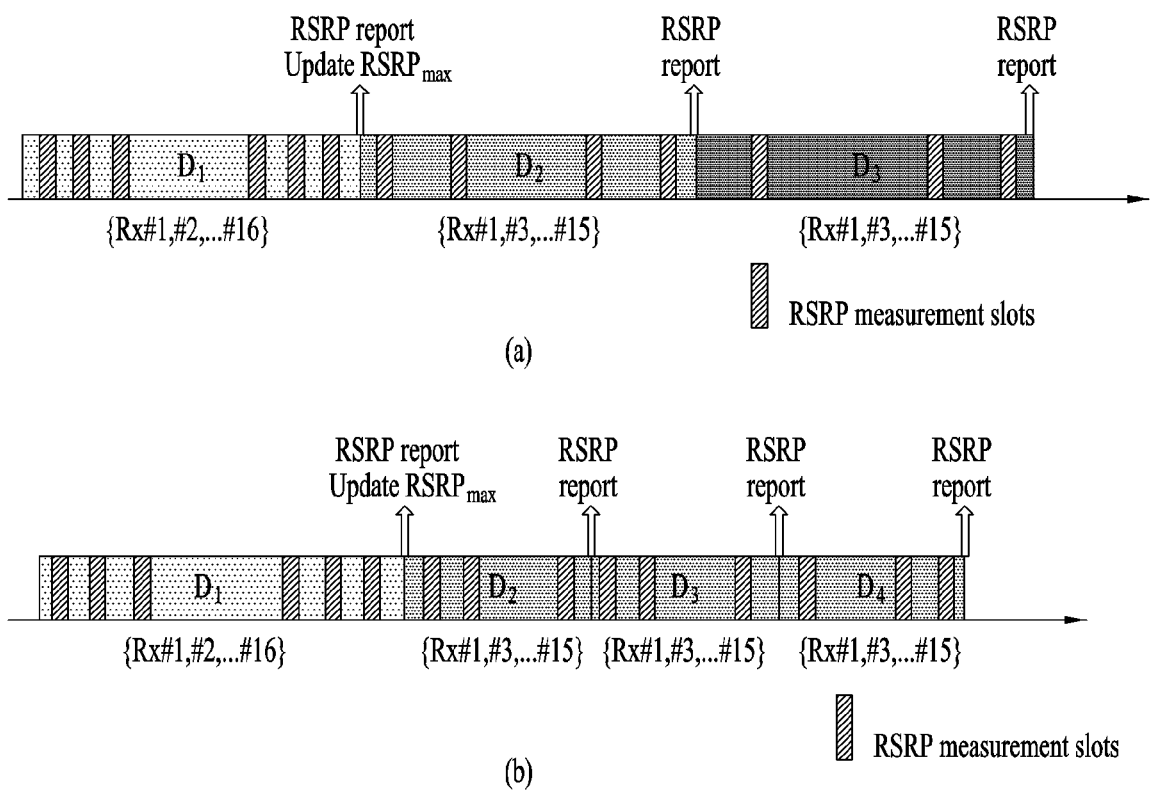
FIG. 9 is a diagram illustrating operation of Scheme #1 according to an embodiment.

FIG. 9 is a diagram illustrating operation of Scheme #1 according to an embodiment.

Referring to (a) of FIG. 9, the UE may halve the periodicity of RSRP measurement, thereby reducing power consumption required to measure RSRP. Alternatively, referring to (b) of FIG. 9, the measurement report period of RSRP may be doubled without changing the periodicity of RSRP measurement. Thereby, when a measurement-related event occurs, the UE may respond more quickly.

b-2. Scheme #2

In the case of Scheme #1, once $RSRP_{max}$ is set, $RSRP_{max}$ is not updated until $RSRP_{ref}$ fails to satisfy the threshold value. As a result, it may be difficult to determine whether the currently measured RSRP value is greater than the actual threshold value. Accordingly, there is a need for a method to more accurately reflect the actual RSRP by continuously updating $RSRP_{max}$ even when $RSRP_{ref}$ satisfies the threshold. Table 7 below explains an example of a method for continuously updating $RSRP_{max}$ even when $RSRP_{ref}$ satisfies the threshold value.

TABLE 7

$D_1$: {RX#1, Rx#2, ... , Rx#15, Rx#16}: Update $RSRP_{max=}$ = max{$RSRP(i), i = 1, 2, 3, ... , 16$}

$D_2$: {RX#1, Rx#3, ... , Rx#13, Rx#15}: $RSRP_{ref}$ = max{$RSRP(i), i = 1, 3, ... 15$} > $RSRP_{max}$ − margin $D_3$: {RX#2, Rx#4, ... , Rx#14, Rx#16}: $RSRP_{ref}$ = max{$RSRP(i), i = 2, 4, ... 16$} > $RSRP_{max}$ − margin Update $RSRP_{max=}$ = max{$RSRP(i), i = 1, 2, 3, ... , 16$}

$D_4$: {RX#1, Rx#3, ... , Rx#13, Rx#15}: $RSRP_{ref}$ = max{$RSRP(i), i = 1, 3, ... 15$} > $RSRP_{max}$ − margin $D_5$: {RX#2, Rx#4, ... , Rx#14, Rx#16}: $RSRP_{ref}$ = max{$RSRP(i), i = 2, 4, ... 16$} > $RSRP_{max}$ − margin Update $RSRP_{max=}$ = max{$RSRP(i), i = 1, 2, 3, ... , 16$}

...

$D_X$: {RX#1, Rx#3, ... , Rx#13, Rx#15}: $RSRP_{ref}$ = max{$RSRP(i), i = 1, 3, ... 15$} < $RSRP_{max}$ − margin $D_{X+1}$: {RX#1, Rx#2, ... , Rx#15, Rx#16}: Update $RSRP_{max=}$ = max{$RSRP(i), i = 1, 2, 3, ... , 16$}

$D_{X+2}$: {RX#1, Rx#3, ... , Rx#13, Rx#15}: $RSRP_{ref}$ = max{$RSRP(i), i = 1, 3, ... 15$} > $RSRP_{max}$ − $margin_{+'}$.

Referring to Table 7, the UE may configure a beam set including 16 beams in duration D1 and measure RSRP using the configured beam set, as in Scheme #1. In addition, the UE may configure 8 beams having odd indexes and 8 beams having even indexes among the multiple beams constituting the beam set as beam sub-sets for use in durations D2 and D3, respectively. For example, the beam sub-set used in duration D2 may be {Rx #1, Rx #3, . . . , Rx #15}, and the beam sub-set used in duration D3 may be {Rx #2, Rx #4, . . . , Rx #16}. However, embodiments are not limited thereto. According to an embodiment, the beam sub-set used in duration D2 may be composed of beams having odd indexes, and the beam sub-set used in duration D3 may be composed of beams having even indexes. Alternatively, as described above, the beams constituting the beam sub-sets used in durations D2 and D3 may have a different beam width from the beams constituting the beam set.

The UE may report the maximum value among the multiple RSRP values measured in each of durations D2 and D3 as $RSRP_{ref}$. Further, when the beam sub-sets used in durations D2 and D3 are combined, the beam set including 16 beams {Rx #1, Rx #2, . . . , Rx #16} may be configured. Therefore, at the end of duration D3, the UE may recognize all the RSRP values measured based on the beam set including 16 beams, and accordingly may update $RSRP_{max}$ based on the RSRPs measured in durations D2 and D3. Accordingly, even when $RSRP_{ref}$ satisfies the threshold value, the UE may persistently update $RSRP_{max}$.

Figure 10:
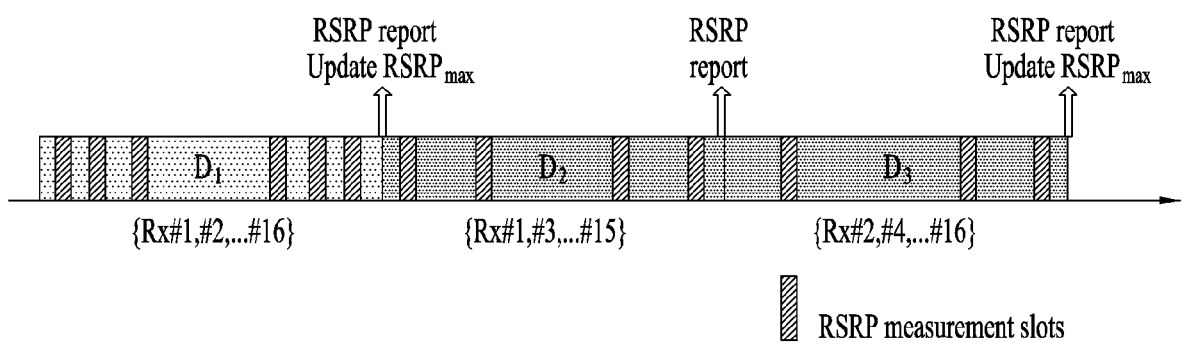
FIG. 10 is a diagram illustrating operation of Scheme #2 according to an embodiment.

FIG. 10 is a diagram illustrating operation of Scheme #2 according to an embodiment.

Referring to FIG. 10, as in Scheme #1, the UE may halve the periodicity of RSRP measurement, thereby reducing power consumption required to measure RSRP. Alternatively, the measurement report period of RSRP may be doubled without changing the periodicity of RSRP measurement. Thereby, when a measurement-related event occurs, the UE may respond more quickly.

In Scheme #2, the UE may periodically update $RSRP_{max}$. Referring to FIG. 10, the UE may update $RSRP_{max}$ at the end of duration D3 based on the RSRPs measured in durations D2 and D3.

Extracting a Sample for Obtaining $RSRP_{ref}$ from Multiple RSRPs Measured Using a Beam Set As described above, the UE may configure a beam sub-set based on a beam set for RSRP measurement, and measure multiple RSRPs using the configured beam sub-set. However, when it is not easy to change the configuration of the beam sub-set, the UE should measure RSRP using the beam set. In this case, an overlap region between the beams constituting the beam set may be relatively large, and an optimal beam may not be formed during actual operation of the system. In addition, when signals are received from a target cell in multiple directions, the maximum value among the multiple measured RSRPs may not reflect the signal strength of the cell. Therefore, in consideration of the above-described situations, a method of determining a representative value $RSRP_{ref}$ based on the multiple RSRPs measured using the beam set may be needed. Hereinafter, a method of determining, by a UE, $RSRP_{ref}$ based on multiple RSRPs (e.g., $RSRP_{after}(i)$) measured using a beam set will be described in detail.

The UE determines the number of samples used to determine $RSRP_{ref}$ such that the value of $RSRP_{ref}$ determined based on the result of measuring RSRP (or RSRQ) for each reception beam satisfies a threshold condition formed by applying a margin value to the maximum value. Then, the UE selects samples within the determined number of samples.

The UE uses a threshold value obtained by applying the margin value to select RSRPs (e.g., $RSRP_{after}(i)$) which are to be used to determine $RSRP_{ref}$. The threshold value may be determined based on the maximum value among the multiple measured RSRPs and the margin value. For example, a value obtained by subtracting the margin value from the maximum value may be used as the threshold value.

The UE selects only RSRP samples greater than the threshold value, which is obtained by applying the margin value, as valid samples, and selects one sample from among the selected samples to determine $RSRP_{ref}$. For example, the UE may determine $RSRP_{ref}$ by calculating an average of the selected samples, a weighted average obtained by applying weights to the samples, or a median value of the samples, but embodiments are not limited thereto. In addition to the above-described method, various methods for determining a representative value $RSRP_{ref}$ of the selected samples may be applied.

In selecting samples as described above, when all the samples are greater than the threshold value obtained by applying the margin value, the average of the samples may exhibit characteristics similar to omni-directional measurement of RSRP, and does not reflect beamforming characteristics at all. Accordingly, in the case where all the samples are greater than the threshold value obtained by applying the margin value, the UE may extract primary samples for determining $RSRP_{ref}$ based on the threshold value obtained by applying the margin value. Then, when the number of the extracted primary samples exceeds K, the UE may extract final samples by extracting only K samples in descending order among the extracted primary samples. Here, K may be predefined or set by the BS.

Figure 11:
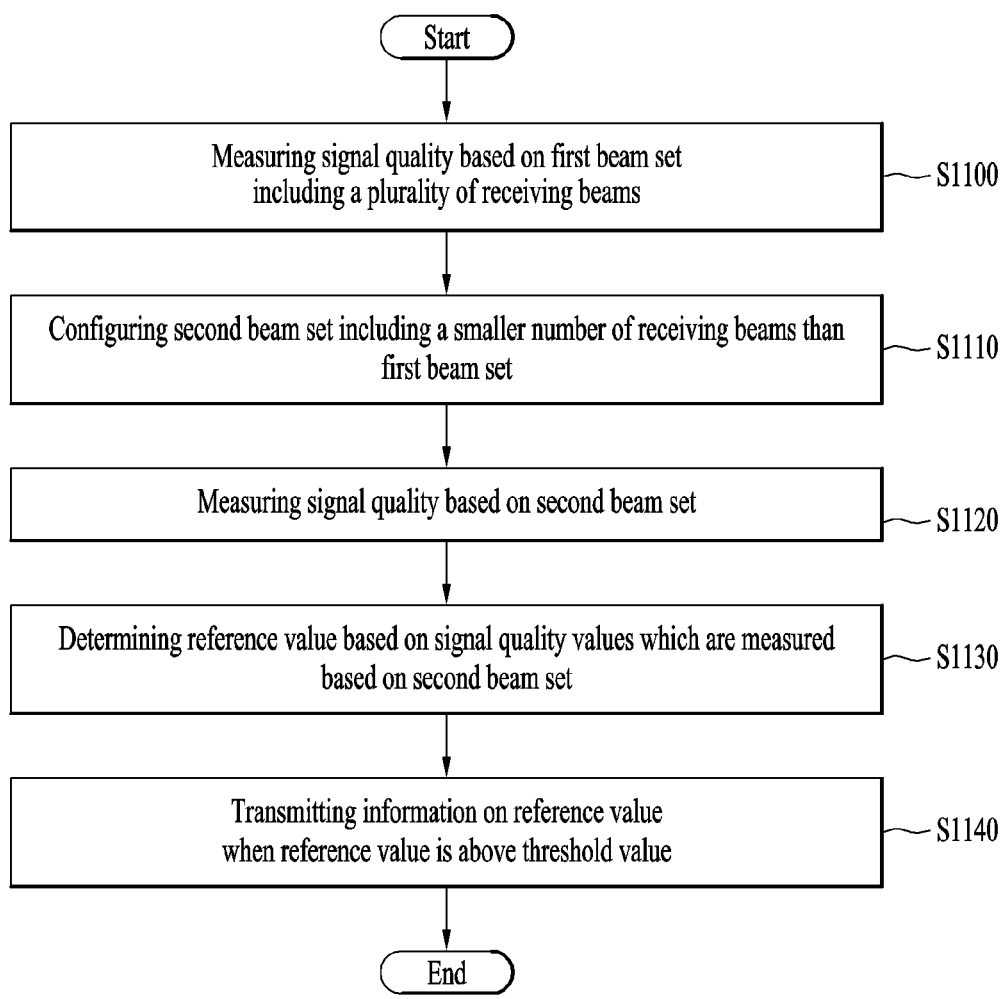
FIG. 11 is a flowchart illustrating a method of operating a UE according to the present invention.

FIG. 11 is a flowchart illustrating a method of operating a UE according to the present invention.

In operation S1100, the UE measures signal quality of a neighboring cell based on a first beam set including multiple reception beams. For example, the UE may measure RSRP or RSRQ of the neighboring cell based on the first beam set. When the UE measures RSRP of the neighboring cell, the first beam set may be referred to as a beam set for RSRP measurement. However, the present disclosure is not limited to the above-described example. The first beam set may be configured by extracting some of the multiple reception beams formed based on multiple antenna elements constituting the UE. For example, when the UE is composed of 16 antenna elements, the first beam set may be composed of 16 beams extracted from 64 reception beams formed based on the 16 antenna elements. However, embodiments are not limited thereto.

In operation S1110, the UE may configure a second beam set including a smaller number of reception beams than the first beam set, based on the first beam set. For example, when the first beam set consists of 16 beams, the second beam set may consist of 8 beams. However, embodiments are not limited thereto. The second beam set may be configured by extracting some reception beams from the multiple reception beams constituting the first beam set, or may be composed of beams having a different beam width from the multiple beams included in the first beam set. For example, when the first beam set is composed of {Rx #1, Rx #2, . . . , Rx #16}, the second beam set may be composed of 8 reception beams having odd indexes or 8 reception beams having even indexes. Further, when the first beam set is composed of 16 beams having a beam width of 30 degrees, the second beam set may be composed of 8 beams having a beam width of 60 degrees. However, embodiments are not limited to the above-described example. According to an embodiment, the second beam set may be configured in multiple levels.

In operation S1120, the UE measures the signal quality of the neighboring cell based on the second beam set. For example, the UE may measure RSRP or RSRQ of the neighboring cell based on the second beam set. However, embodiments are not limited thereto.

In operation S1130, the UE determines a reference value for the signal quality of the neighboring cell based on the quality values measured based on the second beam set. Here, the reference value may be a value representing the signal quality of the neighboring cell. For example, the reference value may be determined as the maximum value among the quality values measured based on the second beam set. However, embodiments are not limited thereto.

In addition, according to an embodiment, the UE may measure the signal quality of the neighboring cell based on the second beam set at a first time and measure the signal quality of the neighboring cell based on a third beam set at a second time. For example, the second beam set may include beams having odd indexes among the multiple reception beams included in the first beam set, and the third beam set may include beams having even indexes among the multiple reception beams included in the first beam set. When the first time and the second time have elapsed, the UE may update the threshold value based on quality values measured based on the second beam set and the third beam set. For example, when the first beam set is configured as {Rx #1, #2, . . . , #15, #16}, the second beam set may be configured as {Rx #1, #3, . . . , #15}, and the third beam set may be configured as {Rx #2, #4, . . . , #16}. The first time and the second time may be different from each other, but a change in the channel may not be significant at the first time and the second time. Here, when the quality values measured based on the second beam set and the third beam set are combined, all the quality values measured based on {Rx #1, #2, . . . , #15, #16} may be identified. Accordingly, the UE may update the threshold value based on the maximum value among the quality values measured based on the second beam set and the third beam set and the margin value.

According to an embodiment, an overlap region between the beams included in the second beam set may be relatively large. Here, the maximum value among the quality values measured based on the second beam set may hardly be considered to represent the signal quality of the neighboring cell. Accordingly, the UE may select quality values greater than a threshold value from among the quality values measured based on the second beam set, and determine a reference value based on the selected quality values. Here, the reference value may be determined as an average, weighted average, or median value of the selected quality values, but is not limited thereto.

In operation S1140, the UE transmits information about the reference value to the BS when the determined reference value is greater than or equal to the threshold value. Here, the threshold value may be determined based on the maximum value among the quality values measured based on the first beam set and a preset margin value. For example, the threshold value may be determined by subtracting the preset margin value from the maximum value among the quality values measured based on the first beam set. When the reference value is less than the threshold value, this may mean that the determined reference value does not properly reflect the signal quality of the neighboring cell. The reference value is a value determined based on the quality values measured based on the second beam set. Accordingly, when the reference value is less than the threshold value, the UE may update the second beam set. For example, the UE may expand the second beam set to a beam set including more reception beams than the second beam set. Accordingly, the beam set including more reception beams than the second beam set may be an updated second beam set. For example, the updated second beam set may be the first beam set, but is not limited thereto. The UE may measure the signal quality of the neighboring cell based on the updated second beam set, and update the threshold value based on the measured quality values. Here, the threshold value may be determined based on the maximum value among the quality values measured based on the updated second beam set and the preset margin value.

Accordingly, the UE may more efficiently measure the signal quality of the neighboring cell using multiple reception beams, and reduce power consumed for measurement of the signal quality of the neighboring cell. In addition, the UE may measure the signal quality of the neighboring cell more accurately while using a smaller number of reception beams.

Figure 12:
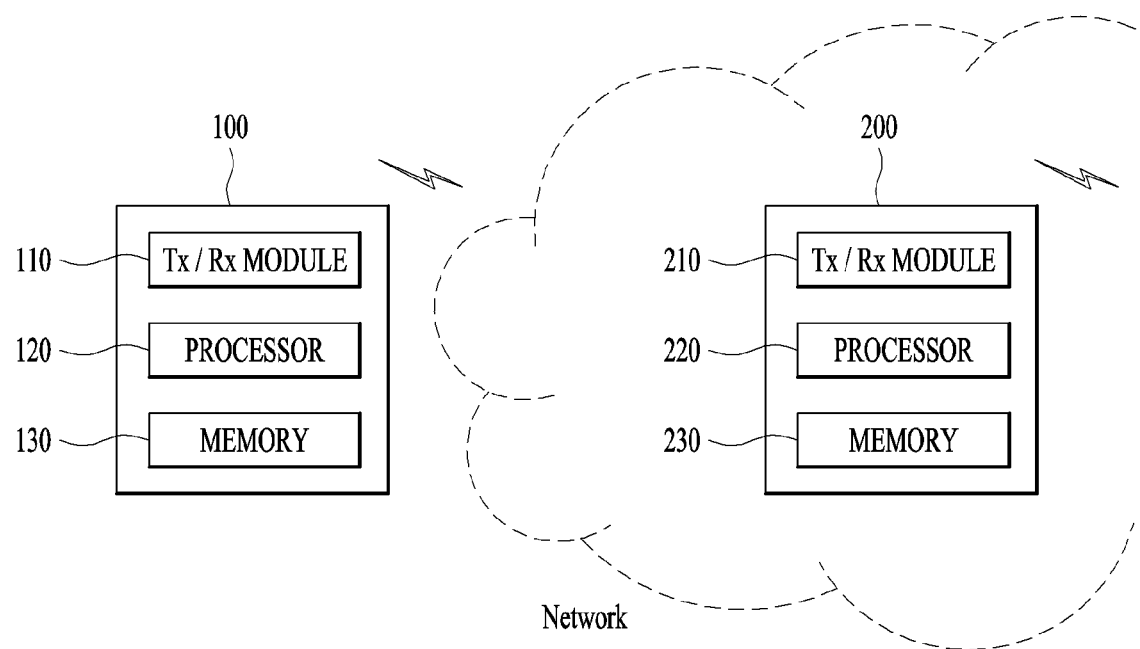
FIG. 12 is a diagram illustrating a configuration of a user equipment (UE) and a base station (BS).

FIG. 12 is a diagram illustrating a configuration of a UE and a BS according to the present disclosure.

A UE 100 according to a proposed embodiment may include a transceiver 110, a processor 120, and a memory 130. The transceiver 110 of the UE 100 may be referred to as a radio frequency (RF) unit or a transmission/reception module. The transceiver 110 may be configured to transmit various signals, data and information to an external device, and to receive various signals, data and information from the external device. Alternatively, the transceiver 110 may be embodied as a transmitter and a receiver separated from each other. The UE 100 may be connected to an external device in a wired and/or wireless manner. The processor 120 may control the overall operation of the UE 100 and may be configured to perform a function of computational processing of information and the like that the UE 100 transmits and receives from and to an external device. In addition, the processor 120 may be configured to perform the operation of the UE 100 proposed in the present disclosure. The processor 120 may control the transceiver 110 to transmit data or a message according to the proposal of the present disclosure. The memory 130 may store computationally processed information and the like for a predetermined time, and may be replaced with an element such as a buffer (not shown).

Referring to FIG. 12, the BS 200 according to the proposed embodiment may include a transceiver 210, a processor 220, and a memory 230. In communicating with the UE 100, the transceiver 210 may be referred to as a transmission/reception module or an RF unit. The transceiver 210 may be configured to transmit various signals, data and information to an external device, and to receive various signals, data and information from the external device. The BS 200 may be connected to an external device in a wired and/or wireless manner. The transceiver 210 may be embodied as a transmitter and a receiver separated from each other. The processor 220 may control the overall operation of the BS 200, and the BS 200 may be configured to perform a function of computational processing of information and the like to be transmitted and received to and from an external device. In addition, the processor 220 may be configured to perform the operation of the BS 200 proposed in the present disclosure. The processor 220 may control the transceiver 210 to transmit data or a message to the UE 100 or another BS according to the proposal of the present disclosure. The memory 230 may store computationally processed information and the like for a predetermined time, and may be replaced with an element such as a buffer (not shown). In an access network, the BS 200 may be an eNB or gNB.

The specific configuration of the UE 100 and the BS 200 as described above may be implemented such that the details described in various embodiments of the present disclosure are applied independently or two or more embodiments are applied simultaneously. Redundant descriptions are omitted for clarity.

The processor 120 of the UE 100 according to the present disclosure measures signal quality of a neighboring cell based on a first beam set including multiple reception beams. For example, the processor 120 of the UE 100 may measure RSRP or RSRQ of the neighboring cell based on the first beam set. Here, the first beam set may be configured by extracting some of the multiple reception beams formed based on multiple antenna elements constituting the UE.

In addition, the processor 120 of the UE 100 according to the present disclosure may configure a second beam set including a smaller number of reception beams than the first beam set based on the first beam set. The second beam set may be configured by extracting some reception beams from the multiple reception beams constituting the first beam set, and may be composed of beams having a different beam width from the multiple beams included in the first beam set. For example, when the first beam set is composed of {Rx #1, Rx #2, . . . , Rx #16}, the second beam set may be composed of 8 reception beams having odd indexes or 8 reception beams having even indexes. Further, when the first beam set is composed of 16 beams having a beam width of 30 degrees, the second beam set may be composed of 8 beams having a beam width of 60 degrees. However, embodiments are not limited thereto. According to an embodiment, the second beam set may be configured in multiple levels.

The processor 120 of the UE 100 also measures signal quality of a neighboring cell based on the second beam set. For example, the UE may measure RSRP or RSRQ of the neighboring cell based on the second beam set. However, embodiments are not limited thereto.

The processor 120 of the UE 100 determines a reference value for the signal quality of the neighboring cell based on the quality values measured based on the second beam set. Here, the reference value may be a value representing the signal quality of the neighboring cell. For example, the reference value may be determined as the maximum value among the quality values measured based on the second beam set. However, embodiments are not limited thereto.

According to an embodiment, the processor 120 of the UE 100 may measure the signal quality of the neighboring cell based on the second beam set at a first time and measure the signal quality of the neighboring cell based on a third beam set at a second time. For example, the second beam set may include beams having odd indexes among the multiple reception beams included in the first beam set, and the third beam set may include beams having even indexes among the multiple reception beams included in the first beam set. The processor 120 of the UE 100 may update the threshold value based on the quality values measured based on the second beam set and the third beam set when the first time and the second time have elapsed. For example, when the first beam set is configured as {Rx #1, #2, . . . , #15, #16}, the second beam set may be configured as {Rx #1, #3, . . . , #15}, and the third beam set may be configured as {Rx #2, #4, . . . , #16}. The first time and the second time may be different from each other, but a change in the channel may not be significant at the first time and the second time. Here, when the quality values measured based on the second beam set and the third beam set are combined, all the quality values measured based on {Rx #1, #2, . . . , #15, #16} may be identified. Accordingly, the processor 120 of the UE 100 may update the threshold value based on the maximum value among the quality values measured based on the second beam set and the third beam set and the margin value.

According to an embodiment, an overlap region between the beams included in the second beam set may be relatively large. In this case, the maximum value among the quality values measured based on the second beam set may hardly be considered to represent the signal quality of the neighboring cell. Accordingly, the processor 120 of the UE 100 may select quality values greater than a threshold value from among the quality values measured based on the second beam set, and determine a reference value based on the selected quality values. Here, the reference value may be determined as an average, a weighted average, or a median value of the selected quality values, but is not limited thereto.

In addition, the processor 120 of the UE 100 controls the transceiver 110 to transmit information about the reference value to the BS 200 when the determined reference value is greater than or equal to the threshold value. Here, the threshold value may be determined based on the maximum value among the quality values measured based on the first beam set and a preset margin value. For example, the threshold value may be determined by subtracting the preset margin value from the maximum value among the quality values measured based on the first beam set. When the reference value is less than the threshold value, this may mean that the determined reference value does not properly reflect the signal quality of the neighboring cell. The reference value is a value determined based on the quality values measured based on the second beam set. Accordingly, when the reference value is less than the threshold value, the processor 120 of the UE 100 may update the second beam set. For example, the processor 120 of the UE 100 may expand the second beam set to a beam set including more reception beams than the second beam set. Accordingly, the beam set including more reception beams than the second beam set may be an updated second beam set. For example, the updated second beam set may be the first beam set, but is not limited thereto. The processor 120 of the UE 100 may measure the signal quality of the neighboring cell based on the updated second beam set, and update the threshold value based on the measured quality values. Here, the threshold value may be determined based on the maximum value among the quality values measured based on the updated second beam set and a preset margin value.

The embodiments of the present disclosure may be implemented through various means. For example, the embodiments may be implemented by hardware, firmware, software, or a combination thereof.

When implemented by hardware, a method according to embodiments of the present disclosure may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present disclosure may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable not only to 3GPP systems, but also to various wireless communication systems including IEEE 802.16x and 802.11x systems. Moreover, the proposed method can also be applied to mmWave communication using an ultra-high frequency band.

The invention claimed is:

1. A method for transmitting and receiving signals by a user equipment (UE) in a wireless communication system, the method comprising:
measuring a signal quality based on a first beam set including a plurality of reception beams;
configuring a second beam set including a smaller number of reception beams than the first beam set based on the first beam set;
measuring the signal quality based on the second beam set;
determining a reference value for the signal quality based on values of the quality measured based on the second beam set; and
transmitting, to a base station, information on the reference value based on the reference value greater than or equal to a threshold value,
wherein the threshold value is determined based on a preconfigured margin value and a maximum value among values of the quality measured based on the first beam set.

2. The method of claim 1, further comprising:
based on the reference value less than the threshold value, updating the second beam set;
measuring the signal quality based on the updated second beam set; and
updating the threshold value based on the values of the quality measured based on the updated second beam set.

3. The method of claim 2, wherein the updating of the second beam set comprises:
expanding the second beam set to a beam set including a larger number of reception beams than the second beam set.

4. The method of claim 3, wherein the beam set including the larger number of reception beams than the second beam set comprises the first beam set.

5. The method of claim 1, wherein the second beam set includes beams having odd indexes or beams having even indexes among the plurality of reception beams included in the first beam set.

6. The method of claim 1, wherein the second beam set includes beams having a different beam width from the plurality of reception beams included in the first beam set.

7. The method of claim 1, wherein the reference value is determined as a maximum value among values of the quality measured based on the second beam set.

8. The method of claim 1, wherein the measuring of the signal quality based on the first beam set comprises:
measuring a received signal received power (RSRP) based on the first beam set, and
wherein the measuring of the signal quality based on the second beam set comprises:
measuring an RSRP based on the second beam set.

9. The method of claim 1, wherein the measuring of the signal quality based on the second beam set comprises
measuring the signal quality based on the second beam set at a first time,
the method further comprising:
measuring the signal quality based on a third beam set at a second time; and
based on the first time and the second time having elapsed, updating the threshold value based on values of the quality measured based on the second beam set and the third beam set,
wherein the second beam set includes beams having odd indexes among the plurality of reception beams included in the first beam set, and the third beam set includes beams having even indexes among the plurality of reception beams included in the first beam set.

10. The method of claim 1, wherein the determining of the reference value comprises:
based on that regions of beams included in the second beam set overlap each other, selecting quality values greater than the threshold value from among values of the quality measured based on the second beam set; and
determining the reference value based on the selected quality values.

11. The method of claim 10, wherein the reference value determined based on the selected quality values is determined as an average, weighted average, or median value of the selected quality values.

12. A user equipment (UE) for transmitting and receiving signals in a wireless communication system, the UE comprising:
a transceiver; and
a processor,
wherein the processor is configured to:
measure a signal quality based on a first beam set including a plurality of reception beams;
configure a second beam set including a smaller number of reception beams than the first beam set based on the first beam set;
measure the signal quality based on the second beam set;
determine a reference value for the signal quality based on values of the quality measured based on the second beam set; and
control the transceiver to transmit, to a base station, information on the reference value based on the reference value greater than or equal to a threshold,
wherein the threshold value is determined based on preconfigured margin value and a maximum value among values of the quality measured based on the first beam set.

* * * * *